(12) United States Patent
Brandstein et al.

(10) Patent No.: US 9,523,012 B2
(45) Date of Patent: Dec. 20, 2016

(54) PHOTO-CURABLE INK COMPOSITION

(71) Applicant: Hewlett-Packard Industrial Printing LTD, Netanya (IL)

(72) Inventors: Or Brandstein, San Diego, CA (US); Alex Trubnikov, Petach Tiqwa (IL); Eytan Cohen, Raanana (IL); Nataly Lisitsin, Holon (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 0 days.

(21) Appl. No.: 14/779,821

(22) PCT Filed: Apr. 3, 2014

(86) PCT No.: PCT/IB2014/060402
§ 371 (c)(1),
(2) Date: Sep. 24, 2015

(87) PCT Pub. No.: WO2014/162290
PCT Pub. Date: Oct. 9, 2014

(65) Prior Publication Data
US 2016/0053124 A1 Feb. 25, 2016

(30) Foreign Application Priority Data
Apr. 4, 2013 (EP) .................................... 13162269

(51) Int. Cl.
| C09D 11/101 | (2014.01) |
|---|---|
| C09D 11/326 | (2014.01) |
| C09D 11/322 | (2014.01) |
| C09D 11/40 | (2014.01) |
| C08K 3/04 | (2006.01) |

(52) U.S. Cl.
CPC ............ C09D 11/326 (2013.01); C09D 11/101 (2013.01); C09D 11/322 (2013.01); C09D 11/40 (2013.01); C08K 3/04 (2013.01); C08K 2003/045 (2013.01)

(58) Field of Classification Search
CPC ..... C09D 11/101; C09D 11/40; C09D 11/322; C09D 11/326; C08K 3/04; C08K 2003/045
See application file for complete search history.

(56) References Cited

U.S. PATENT DOCUMENTS

| 5,747,551 A | 5/1998 | Lewandowski et al. |
|---|---|---|
| 2009/0227701 A1 | 9/2009 | Kruger et al. |

(Continued)

FOREIGN PATENT DOCUMENTS

| CN | 1649974 | 8/2005 |
|---|---|---|
| CN | 101573240 | 11/2009 |

(Continued)

Primary Examiner — Manish S Shah
Assistant Examiner — Yaovi M Ameh
(74) Attorney, Agent, or Firm — HP Inc. Patent Department

(57) ABSTRACT

A photo-curable ink composition obtained upon mixing a first printing liquid with a second printing liquid. The first printing liquid includes, at least, UV curable polyurethane dispersions and colorant; the second printing liquid includes, at least, hydrophobic radiation-curable monomers, water-soluble or water-miscible radiation curable monomers and photo-initiators. Also disclosed herein is a set of printing liquids including said first and second printing liquid; an inkjet printing system and a method for forming a printed article.

18 Claims, 1 Drawing Sheet

(56) References Cited

U.S. PATENT DOCUMENTS

2010/0007692 A1\* 1/2010 Vanmaele .......... B29C 67/0055
                                                    347/21
2010/0304149 A1  12/2010 Loccufier et al.
2012/0140005 A1   6/2012 De Voeght et al.

FOREIGN PATENT DOCUMENTS

| EP | 1 935 652      | 6/2008  |
|----|----------------|---------|
| WO | WO-03/093378   | 11/2003 |
| WO | WO-2012/022962 | 2/2012  |
| WO | WO-2013/034880 | 3/2013  |

\* cited by examiner

PHOTO-CURABLE INK COMPOSITION

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Inks used in such technologies can be liquid dispersions, solution, or emulsions and can include oil-based inks, non-aqueous solvent based inks, water-based inks and solid inks. Current inkjet printing technology involves forcing the ink drops through small nozzles by thermal ejection, piezoelectric pressure or oscillation, onto the surface of a media. The deposited ink droplets are, then, dried, e.g., using heat or forced air, or allowed to dry at ambient conditions.

Recently, curing of ink by radiation and, in particular, ultraviolet (UV) curing, has become popular. In these cases, special ink is used and the image is cured by exposure to a radiation source. The uses of such radiation-curable (or photo-curable) inks and the curing process are rapidly becoming an alternative to the established conventional drying process.

The inkjet printing industry uses different types of recording fluids such as oil-based inks, solvent-based (non-aqueous) inks, water-based inks and solid inks (which are melted in preparation for dispensing). Solvent-based inks are fast drying and, as a result, are widely used for industrial printing. When solvent-based inks containing binders and other ingredients are jetted onto a substrate, the solvent(s) partially or fully evaporate from the ink, leaving the binder and other ingredients such as pigment particles on the printed substrate in the form of a dry film. During the drying process, the solvents, which are often volatile organic compounds (VOC), emit vapors and, therefore, can pollute the environment. The pollution problem becomes more critical for higher printing speeds or for wide format images, where large amounts of ink are deposited onto a substrate.

As a result of this and other concerns, efforts related to preparing inks that are environmentally friendly have moved some research in the direction of water-based inks. However, radiation-curable (or photo-curable) water-based ink compositions are noticeably limited among available options due to their specific features. Accordingly, investigations continue into developing radiation-curable water-based ink compositions that exhibit, when printed, specific and excellent printing properties as well as improved stability.

BRIEF DESCRIPTION OF THE DRAWING

The drawings illustrate embodiments of the present composition and method, and are part of the specification.

DETAILED DESCRIPTION

Figure 1:
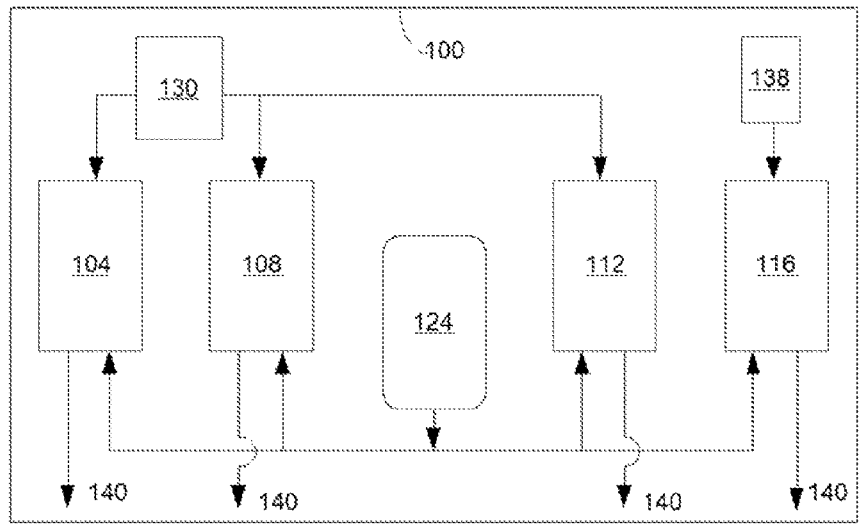
FIG. 1 is an illustration of an ink delivery system suitable for producing and using the photo-curable ink composition according to some embodiments of the present disclosure.

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the composition and method, the following terminology will be used: the singular forms "a", "an" and "the" include plural referents unless the context clearly dictates otherwise. Thus, for example, reference to "a pigment" includes reference to one or more of such materials. Concentrations, amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt % and sub-ranges such as 5 wt % to 15 wt %, 10 wt % to 20 wt %, etc. All percent are by weight (wt %) unless otherwise indicated.

The present disclosure refers to a photo-curable ink composition obtained upon mixing a first printing liquid with a second printing liquid. The first printing liquid includes, at least, UV curable polyurethane dispersions and colorant; the second printing liquid includes, at least, hydrophobic radiation-curable monomers, water-soluble or water-miscible radiation curable monomers and photo-initiators. Also disclosed herein is a set of printing liquids including said first printing liquid and said second printing liquid that are kept in, at least, two separate devices and that form, upon mixing, a photo-curable ink composition.

The present disclosure refers also to an inkjet printing system including a media substrate; a set of printing liquids; an ink delivery system suitable for using the set of printing liquids; and photo energy sources configured to apply photo energy to the ink composition once printed on a substrate, said photo energy having a frequency and energy level suitable for pinning, drying and curing the photo-curable ink composition.

The present disclosure describes, furthermore, a method for forming a printed article including: providing a media substrate; mixing a first printing liquid containing UV curable polyurethane dispersions and colorant with a second printing liquid containing hydrophobic radiation-curable monomers, water-soluble or water-miscible radiation curable monomers and photo-initiators; projecting of a stream of droplets of said photo-curable ink composition onto the media substrate; pinning said ink composition once printed on the media substrate; drying said ink composition; applying photo energy to the ink composition, said photo energy having a frequency and energy level suitable for curing the photo-curable ink composition.

The photo-curable ink composition, as described herein, is obtained upon mixing a first printing liquid with a second printing liquid; it means therefore that the photo-curable ink composition is produced just before or during the printing step and that both first and second printing liquids are kept separated from each other before being used for printing articles. Such production of the photo-curable ink composition is done, for example, during a mixing step where the first printing liquid is added to the second printing liquid or where the second printing liquid is added to the first printing liquid into a mixing device. During this stage, water can be added to the mixture containing the first and second printing liquids.

The obtained ink composition, such as described herein, is photo-curable (or UV-curable or radiation-curable) ink composition. Said composition is a jettable ink composition meaning thus that the ink can be used with inkjet printing device. The term "curing", in the context of the present disclosure, refers to a process of converting a liquid, such as ink, into a solid by exposure to actinic radiation such as photo-radiation, e.g., ultraviolet (UV) radiation. In the uncured state, ink compositions have a low viscosity and are readily jetted. However, upon exposure to suitable source of curing energy, for example ultraviolet (UV) light, electrons beam energy and/or the like, there is a formation of a cross-linked polymer network. Such ink compositions are commonly referred to as "energy-curable" inks to distinguish them from "solvent-based" inks.

The photo-curable ink composition, which is obtained upon mixing the first and the second printing liquids, can be printed in a broad selection of substrates including untreated plastics, flexible as well as rigid, porous substrates such as paper, cardboard, foam board and textile and has a good adhesion on said variety of substrates. Such obtained photo-curable ink composition has a good viscosity that enables good printing performances and enables the ability to formulate inks suitable for inkjet application. The photo-curable ink composition of the present disclosure enables high printing speed and is very well suited for a use in digital inkjet printing.

When printed on a substrate and cured, said ink composition can support high curing speed and has a viscosity enabling good jetting properties. Therefore, such photo-curable ink composition allows reliable jetting, fast drying and curing, ability to print on various media substrates while having excellent image quality and adhesion.

The photo-curable ink composition, which is obtained upon mixing the first and the second printing liquids, has a relatively long shelf life time and is able to remain stable even when exposed to temperatures above 40° Celsius. Such exposures could occasionally occur, for example, in course of ink shipping. Such stability properties allow then not having reduction in the printed image quality and eliminate difficulties that can occur in ink curing (as print quality is linked to hydrolytic stability of the ink components in water and as such hydrolysis can be accelerated as temperature increases).

In some examples, the photo-curable ink composition obtained upon mixing a first printing liquid with a second printing liquid is a water-based photo-curable ink composition, meaning thus that it contains a certain amount of water as solvent. Such amount of water is dependent on the amount of other components present in the first and in the second printing liquids. The amount of water, in the photo-curable ink composition, includes the amount of water added plus the amount of water present in the suspensions and in the other components of the printing liquids.

In some examples, the amount of water, in the final photo-curable ink composition, is in the range of about 10 to about 75 wt % by total weight of said obtained ink composition. In some other examples, the amount of water is in the range of about 15 to about 70 wt % by total weight of the obtained photo-curable ink composition. The mix of the first printing liquid and of the second printing liquid may thus represent thus from about 25 wt % to about 90 wt % by total weight of the obtained photo-curable ink composition.

First Printing Liquid

The photo-curable ink composition, as defined herein, is obtained upon mixing a first printing liquid with a second printing liquid wherein the first printing liquid includes, at least, UV curable polyurethane dispersions and colorant; and wherein the second printing liquid includes hydrophobic radiation-curable monomers, water-soluble or water-miscible radiation curable monomers and photo-initiators. The amount of the first printing liquid, in the final photo-curable ink composition, can represent from about 45 to about 75 wt % of the total weight of the final photo-curable ink composition. In some examples, the first printing liquid is water-based, meaning thus that it contains a certain amount of water as solvent.

UV Curable Polyurethane Dispersion

The first printing liquid includes UV curable polyurethane dispersion, i.e. UV-PUD. As polyurethane dispersion, it is meant herein polyurethane particles that are dispersed in a liquid vehicle. Without being linked by any theory, it is believed that such UV curable polyurethane dispersions provide improved ink film properties to the media on which the ink is applied. In some examples, polyurethane dispersions (PUD) are stable dispersions, in water, of polyurethane polymer particles whose size ranges from about 20 to about 200 nm. The polyurethane dispersions can have a Mw in the range of about 1,000 to 100,000 or in the range of about 5,000 to about 50,000. Polyurethane polymer particles can be present in an amount representing from about 1 wt % to about 25 wt %, or from about 5 wt % to about 20 wt % by total weight of the obtained final photo-curable ink composition.

Polyurethane polymer particles can have a core-shell structure with a branched inner core structure, wherein the core includes an amine cross-linker in an amount of about 0.1 wt % to about 1 wt % and wherein the shell includes a polyol cross-linker in an amount of about 0.5 wt % to about 2 wt %. The branched inner core structure can be provided by a branched diisocyanate which can be a cyclic diisocyanate. The branched inner core structure can also be provided by a branched diol or a cyclic diol. Polyurethane polymer particles may further contain polymerized monomers including a polyol, a branched diisocyanate and an acid polyol. Polyurethane polymer particles include various polyols that can be present as a diol polymerized within a hard segment of the polyurethane particle. In some examples, the polyol can be a diol selected from the group of: cyclic diols; 1,3-cyclohexanedimethanol; 1,4-cyclohexanedimethanol; aliphatic polycarbonate diols; polyether diols; polyethylene glycol; polypropylene glycol; polytetramethylene glycol; poly(ethylene oxide)polymers; poly(propylene oxide)polymers; poly(tetramethylene oxide)polymers; copolymers thereof having terminal hydroxyl groups derived from polyhydric compounds including diols; and combinations thereof. In one aspect, the diol can be cyclic diol. In another aspect, the diol can be an aliphatic cyclic diol. In still another aspect, the diol can be 1,4-cyclohexanedimethanol. The diisocyanates can be selected from the group of cycloaliphatic diisocyanates, bis(4-isocyanotocyclohexyl)methane, methylene diphenyl diisocyanate, hexamethylene diisocyanate, p-tetramethyl xylene diisocyanate, m-tetramethyl xylene diisocyanate, bitolylene diisocyanate, toluene diisocyanate, methylene-bis(4-cyclohexyl)diisocyanate, p-phenylene diisocyanate, isophorone diisocyanate, 1,5-naphthalene diisocyanate and mixtures thereof. In one aspect, the diisocyanate can be a cycloaliphatic diisocyanate. The acid polyol can have the structure HO—$(CH_2)n(CR_1R_2)m(CH_2)p$—OH where $R_1$ and $R_2$ are independently H, hydroxyl, an alkyl group, or an acid group; n ranges from 0 to 20; p ranges from 0 to 20; and m ranges from 1 to 20; wherein at least one of $R_1$ and $R_2$ is an acid group. Diisocyanate can be present in the polyurethane particles from about 10 wt % to about 70 wt %. The acid polyol can be present in the polyurethane particles from about 1 wt % to about 40 wt %. In further detail, diols can be present from about 1 wt % to about 3 wt %.

In some examples, UV-PUD are water-dispersible acrylic functional polyurethane dispersions. In some other examples, UV-PUD are water-dispersible (meth)acrylated polyurethane dispersions. By water-dispersible (meth)acrylated polyurethane is meant herein a polymer that, when mixed with water, can form a two-phase system of small particles dispersed in water. Water-dispersible (meth)acrylated polyurethane can be, water-dispersible resins, such as, for examples, compounds commercialized under the name of Ucecoat®6558, Ucecoat®6559, Ebecryl®2002 and Ebecryl®2003 available from Cytec.

In some embodiments, the UV curable polyurethane dispersions (UV-PUD) is an water-dispersible (meth)acrylated polyurethane, sold under the trade name of NeoRad® R441 by NeoResins (Avecia). Other representative but non limiting examples of UV-PUD include Ucecoat®7710, Ucecoat®7655 (available from Cytec), Neorad®R440, Neorad®R441, Neorad®R447, Neorad®R448 (available from DSM NeoResins), Bayhydrol®UV 2317, Bayhydrol®UV VP LS 2348 (available from Bayer), Lux®430, Lux®399, Lux®484 (available from Alberdingk Boley), Laromer®LR8949, Laromer®LR8983, Laromer® PE22WN, Laromer®PE55WN, Laromer®UA9060 (available from BASF).

Colorant

The first printing liquid, that is used to obtain photo-curable ink compositions, includes colorants. Such first printing liquid may include pigments or dyes as colorants. The first printing liquids can include one or more pigments as colorants. In some examples, the first printing liquid includes pigment dispersions as colorants. The pigments can be self-dispersed pigments, polymer-coated pigments, or common pigments such as milled pigments. A separate dispersing agent may be used to enable appropriate suspension of the pigment in the first printing liquid. The pigment may be inorganic or organic. The pigment can be of any color including, but not limited to, black, blue, brown, cyan, green, white, violet, magenta, red, orange and yellow, as well as spot colors from mixtures thereof.

Examples of organic pigments that may be present in the photo-curable first printing liquid include, by way of illustration and not limitation, perylene, phthalocyanine pigments (for example, phthalo green, phthalo blue), cyanine pigments (Cy3, Cy5 and Cy7), naphthalocyanine pigments, nitroso pigments, mono-azo pigments, di-azo pigments, di-azo condensation pigments, basic dye pigments, alkali blue pigments, blue lake pigments, phloxin pigments, quinacridone pigments, iso-indolinone pigments, di-oxazine pigments, carbazole di-oxazine violet pigments, alizarine lake pigments, phthaloxy amine pigments, carmine lake pigments, tetrachloroisoindolinone pigments, perinone pigments, thio-indigo pigments, anthraquinone pigments and quinophthalone pigments and mixtures of two or more of the above and derivatives of the above. Inorganic pigments that may be present in the first printing liquid, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides and mixtures of two or more thereof.

Examples of pigment colorants that may be employed include, by way of illustration and not limitation, yellow pigments having the following Yellow Pigment color index PY 83, PY 151, PY 150, PY 155, PY 139, PY120, PY180, PY 129 and PY 154, PY213. Magenta pigments composed of Red pigment having color indices of PR 202, PR 254, PR 122, PR149, PR185, PR255, PR146 and Violet pigment having color indices of PV 19, PV 23, PV37 and PV 29 may be used. Blue pigments having color indices of PB 15:3, PB 15:4, PB15:2 and PB15:1, as well as black pigments having color indices of PBL black 7 also may be utilized. Inorganic pigment such as a white pigment of the type $TiO_2$ also may be used. Orange pigment having color indices of PO46, PO64, PO34 as well as green pigments having color index of PG7 also may be employed. The pigment component can be a dispersible pigment, such as, for example, pigment available under the trade names Paliotol®, Heliogen®, Chromophtal®, Irgalite®, Cinquasia® (available from BASF), Hostaperm®, Novoperm® (available from Clariant), Sunfast®, Quindo® (available from SunChemical), Special Black (available from Degussa), Kronos® (available from Kronos), Kemira® (available from Kemira Pigments).

The amount of pigment in the first printing liquid depends on a number of factors, for example, the nature of the pigment, the nature of the use of the first printing liquid, the nature of the jetting mechanism for the ink and the nature of any additives, for example. The first printing liquid may contain up to 20 wt % of pigment. In some example, the amount of pigment, in the final photo-curable ink composition, is from about 0.1 to about 20 wt %, or from about 1 to about 15 wt %, or from about 5 to about 10 wt %.

Solvent

The first printing liquid described herein may contain an organic solvent. The organic solvent can be soluble (water-soluble) or miscible in water (water-miscible). Such water-soluble soluble or water-miscible solvent can be added to the first printing liquid while milling pigment concentrate in order to optimize pigment dispersion, color development and stability. The amount of the organic solvent in the ink composition is dependent on a number of factors such as, for example, optimization of a film forming process, jetting reliability and maintaining a low VOC content of the ink composition. When present, the amount of organic solvent in the obtained ink composition is about 0.1 wt % to about 5 wt % by total weight of the final photo-curable ink composition. The organic solvent can be, by way of illustration and not limitation, an alcohol; a polyhydric alcohol; a glycol derivative such as, e.g., an ether or an ester; an amine; an amide; and other organic solvents such as, for example, dimethyl-sulfoxide, sulfolane, 2-pyrrolidone, 2-oxazolidone, 1,3-dimethyl-2-imidizolidinone. The above-mentioned organic solvents can be used in combination of two or more thereof. In some examples, the organic solvent is a glycol, a glycol ether, an alcohol, or a heterocyclic ketone, or a combination of two or more of the above. Some examples of particular organic solvents include, by way of illustration and not limitation, glycol ether solvents, for example, tri-propylene glycol monomethyl ether (Dowanol®TPM), dipropylene glycol ether (Dowanol®DPG), dipropylene glycol dimethyl ether (Proglyde®DMM) (all available from Dow Chemical Company, Midland Mich.), for example.

Second Printing Liquid

As described herein, the photo-curable ink composition is obtained upon mixing a first printing liquid with a second printing liquid. The second printing liquid includes hydrophobic radiation-curable monomers, water-soluble or water-miscible radiation curable monomers and photo-initiators.

The second printing liquid can be considered as a physical blend of monomers/oligomers wherein some are more hydrophobic and some are more hydrophilic. No water is present in such second printing liquid. The second printing liquid can be considered as a matrix, i.e. a blend of monomers/oligomers that later, upon curing, will polymerize in view of forming a continuous film. The colorants/pigments, part of the first printing liquid, once mixed with the second liquid for forming the photo-curable ink composition, will be embedded in the matrix after curing. The amount of the second printing liquid, in the final photo-curable ink composition, can represent from about 5 to about 15 wt % of the total weight of the obtained photo-curable ink composition.

Hydrophobic Radiation-Curable Monomers

The second printing liquid, that is used to obtain the photo-curable ink compositions, includes one or more hydrophobic radiation-curable monomers. Subject to desired performance standards, any hydrophobic radiation-curable monomers with sufficient hydrolytic stability may be incorporated into said second printing liquid.

The hydrophobic radiation-curable monomers may be mono-, di-, tri-, tetra- or otherwise multifunctional in terms of radiation-curable moieties. The hydrophobic radiation-curable monomers can function as solvents for the photo-initiators, as viscosity modifiers, as binders when cured and/or as cross-linking agents. The amount of such hydrophobic radiation-curable monomers to be incorporated into the second printing liquid can vary within a wide range depending upon the intended use of the resultant ink curable composition. The hydrophobic monomer can be present at a level of about 1 to about 15% by weight based on the total weight of the final photo-curable ink composition or in an amount representing from about 3 to about 8 wt % based on the total weight of the final photo-curable ink composition.

In some examples, the hydrophobic radiation-curable monomers are hydrophobic monofunctional radiation-curable monomers. In some other examples, the hydrophobic radiation-curable monomers are acrylate monomers or vinyl monomers.

The monofunctional hydrophobic radiation-curable monomers can be acrylate monomer. The acrylate monomer can be selected from the group consisting of 2-phenoxyethyl acrylate, isophoryl acrylate, isodecyl acrylate, tridecyl acrylate, lauryl acrylate, 2-(2-ethoxy-ethoxy)ethyl acrylate, tetrahydrofurfuryl acrylate, isobornyl acrylate, propoxylated acrylate, tetrahydrofurfuryl methacrylate, 2-phenoxyethyl methacrylate, isobornyl methacrylate and combinations of two or more thereof.

Monofunctional hydrophobic radiation-curable monomers can be vinyl monomers. Vinyl monomer can be selected from the group consisting of vinyl caprolactam, vinyl ether and any combinations thereof. In some examples, hydrophobic radiation-curable monomers used herein are the ones that do not require labeling with Xi or any other danger symbol, like, for example, 2-phenoxy-ethylacrylate, available from Sartomer under the tradename SR339C. In some embodiments, hydrophobic radiation-curable monomers are selected from the group consisting of vinyl caprolactams, hexanediol diacrylates, trimethylolpropane triacrylates and propoxylated neopentyl glycol diacrylates. In some other some embodiments, hydrophobic radiation-curable monomers are vinyl caprolactams.

The hydrophobic radiation-curable monomers can be hydrophobic multifunctional radiation-curable monomers. Examples of such higher functional, radiation-curable monomers include hexanediol diacrylate, ethoxylated bisphenol A diacrylate, trimethylolpropane triacrylate, tris(2-hydroxyethyl) isocyanurate triacrylate, combinations of these and the like. In some examples, multifunctional radiation-curable used herein are the ones that do not require labeling with Xi or any other danger symbol, like propoxylated neopentyl glycol diacrylate, available from Sartomer under the tradename SR 9003.

Water-Soluble or Water-Miscible Radiation Curable Monomers

The second printing liquid, that is used to obtain the photo-curable ink compositions, includes one or more water-soluble or water-miscible radiation curable monomers. As water-soluble or water-miscible radiation curable monomers, it is meant herein any radiation curable monomers that have sufficient water solubility and hydrolytic stability. Such monomer should be capable of being polymerized by radiation and should be soluble or miscible in water.

The water-soluble or water-miscible radiation curable monomers may be mono-, di-, tri-, tetra- or otherwise multifunctional in terms of radiation curable moieties. Water-soluble or water-miscible radiation curable monomers can be present in an amount ranging from about 1 to about 15 wt %, or from about 2 to 10 wt %, or from 3 to 8 wt %, by total weight of the final photo-curable ink composition.

Examples of suitable water-soluble monomers include esters of acrylic or methacrylic acid with polyethylene glycol or with a mono-, di-, tri- or tetra-hydric alcohol derived by ethoxylating a mono-, di, tri- or tetra-hydric aliphatic alcohol of molecular weight less than 200 with ethylene oxide. Examples of ethylenically unsaturated compounds are acrylate esters of polyethylene glycols made from a polyethylene glycol having a molecular weight of from about 200 to about 1500, or from about 400 to about 800; and acrylic esters of ethoxylated trimethylolpropane, having from 9 to 30 ethoxylate residues, or from 10 to 20 ethoxylate residues. Other examples of ethylenically unsaturated compounds are acrylate esters of polyethylene glycols made from a polyethylene glycol having a molecular weight of from about 200 to about 1500 and acrylic esters of ethoxylated trimethylolpropane having from 9 to 30 ethoxylate residues.

Representative and non-limiting examples of water-soluble or water-miscible monomers include polyethylene glycol (600) diacrylate, polyethylene glycol (400) diacrylate, methoxy polyethylene glycol (550) mono-acrylate, polyethylene glycol (6) mono-acrylate, 30 ethoxylated bisphenol-A diacrylate, ethoxylated (20) trimethylopropane-triacrylate, (15) ethoxylated trimethylopropane-triacrylate, tris-tryl phenol 18eo acrylate, glycerol 12eo triacrylate. In some other examples, water-soluble radiation curable monomers are ethoxylated tri-methylpropane triacrylates. Suitable commercially available materials include the following UV-curable materials available from Sartomer such SR415® (ethoxylated (20) trimethylolpropane-triacrylate), CN435® or SR9015®. Other examples of commercially available water-soluble or dispersible monomers include: CD550® (methoxy polyethylene glycol (350) mono-methacrylate), CD552® (methoxy polyethylene glycol (550) mono-methacrylate), SR259® (polyethylene glycol (200) diacrylate), SR344® (polyethylene glycol (400) diacrylate), SR603® (polyethylene glycol (400) di-methacrylate), SR610® (polyethylene glycol (600) diacrylate), SR252® (polyethylene glycol (600) di-methacrylate), SR604® (polypropylene glycol mono-methacrylate, SR256® (2-(2-ethoxyethoxy)ethyl acrylate), SR9035® (ethoxylated(15) trimethylolpropane triacrylate), all available from Sartomer; Ebecryl®11 (polyethylene glycol diacrylate) and Ebecryl®12 (polyether triacrylate) available from UCB; Genomer®1251 (polyethylene glycol 400 diacrylate), Genomer®1343 (ethoxylated trimethylolpropane triacrylate), Genomer® 1348 (glycerol-propoxy triacrylate), Genomer®1456 (polyether polyol tetra-acrylate) and diluent 02-645 (ethoxy ethyl acrylate), all available from Rahn.

Water-soluble radiation curable monomers can be acrylamides monomers. Representative and non-limiting examples of acrylamides water-soluble or water-miscible monomers include N-(2-hydroxyethyl) acrylamide; N,N'-methylene bis-acrylamides and/or N-isopropyl acrylamides. Commercially available water-soluble or dispersible monomers include, for examples, Flocryl®MBA available from SNF FLOERGER (France); Jarchem®HEAA or Jarchem®NIPAM both available from Jarchem (USA, NJ). In some examples, the second printing liquid includes water-soluble or water-miscible radiation curable monomers that are ethoxylated tri-methylpropane triacrylates or acrylamides monomers.

Photo-Initiator

The second printing liquid, that is used to obtain the photo-curable ink compositions, includes one or more photo-initiator. The photo-initiator, or UV initiator, is an agent that initiates a reaction upon exposure to a desired wavelength of UV light to cure the ink composition, as described herein, after its application to an ink-receiving material or substrate. In some examples, the photo-initiator is a radical photo-initiator. The photo-initiator may be a single compound or a mixture of two or more compounds. In some examples, the photo-initiator is present in an amount representing from about 0.01 to about 10 wt %, or from about 1 to about 5 wt % by weight, based on the total weight of the final photo-curable ink composition.

The photo-initiator can be a water-soluble or a water-dispersible photo-initiator. The photo-initiator may be a combination of few photo-initiators, which absorb at different wavelengths. Examples of photo-initiator include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl)phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations of two or more of the above. Amine synergists may also be used, such as, for example, ethyl-4-dimethylaminobenzoate, 2-ethylhexyl-4-dimethylamino benzoate.

The second printing liquid may further include a UV stabilizer, i.e. an agent that can assist with scavenging free radicals. Examples of UV stabilizers include, by way of illustration and not limitation, quinine methide (Irgastab®UV 22 from BASF Corporation) and Genorad®16 (Rahn USA Corporation) and combinations thereof.

Other Components and Additives

Other components and additives may be present in the first and/or in the second printing liquid in order to improve properties and performances of the obtained photo-curable ink composition. The additives include, but are not limited to, one or more of surfactants, dispersing agents, rheology modifiers, biocides, anti-foaming agents and UV stabilizers. In some examples, the first and/or the second printing liquid further contains one or more additives selected from the group consisting of surfactant, dispersing agent, UV stabilizer, de-foaming agent, rheology modifiers and biocides. The total amount by weight of additives in the obtained photo-curable ink composition is, for example, from about 0.1 to about 1 wt % or, from about 0.2 to about 0.5 wt %.

Surfactants include, for example, those commercially available under the brand names: WET® and GLIDE® (from Evonik Tego Chemie GmbH, Essen, Germany); BYK® (from BYK Chemie GmbH, Wesel, Germany); Dynax®(from Dynax Corp. Pound Ridge N.Y.); 3M Novec® (from 3M Energy and Advanced Materials, St. Paul Minn.); and Zonyl® FSO (from DuPont de Nemours Company, Wilmington Del.).

Examples of anti-foaming agents are those commercially available under the brand names: Foamex® and Twin® (from Evonik Tego Chemie Service GmbH); BYK® (from BYK Chemie GmbH); and Surfynol® (from Air Products and Chemicals, Inc.).

Examples of dispersants include high molecular weight copolymers with groups having an affinity for a pigment. Specific examples of dispersants include those commercially available from BYK Chemie GmbH under the brand names BYK®.

Examples of rheology modifiers include those commercially available under the brand names: Acrysol® (from Rohm & Haas); Borchigel® (from OMG Borchers GmbH, Langenfield, Germany); BYK® (from BYK Chemie GmbH); and DSX® (from Cognis GmbH, Monheim am Rhein, Germany).

Set of Printing Liquids and Inkjet Printing System

The present disclosure also refers to a set of printing liquids and to an inkjet printing system. The set of printing liquids encompasses a first printing liquid having, at least, UV curable polyurethane dispersions and colorant; and a second printing liquid having, at least, hydrophobic radiation-curable monomers, water-soluble or water-miscible radiation curable monomers and photo-initiators. The first and the second printing liquids form, upon mixing, a photo-curable ink composition. Such printing liquids are kept in, at least, two separates devices. The set of printing liquids is part of an inkjet printing system.

In some examples, the inkjet printing system includes a media substrate; a set of printing liquids that encompasses in, at least, two separate devices, a first printing liquid with, at least, UV curable polyurethane dispersions and colorant, a second printing liquid with, at least, hydrophobic radiation-curable monomers, water-soluble or water-miscible radiation curable monomers and photo-initiators; an ink delivery system, suitable for using the set of printing liquids; photo energy sources configured to apply photo energy to the ink composition once printed on a substrate, said photo energy having a frequency and energy level suitable for pinning, drying and curing the photo-curable ink composition.

The ink delivery system, that is part of the inkjet printing system, can include mixing devices. The mixing devices can contain the first printing liquid and the second printing liquid and could be located in the printer. The photo-curable ink composition, as described herein, is obtained upon mixing the first and the second printing liquids that are kept separated from each other in devices or reservoirs. In some examples, the second printing liquid is added to the first printing liquid through a controlled dosing process. The mixture of both printing liquids could be prepared using mixing devices and mixing process.

Said ink delivery system is specifically adapted for using a set of printing liquids. The ink delivery system can encompass ink storage tanks, pumps and ink delivery tubing. Such ink delivery system could also include a water treatment unit and a controlled dosing device that will add water in a desired amount to the device containing the mixture of the first and second printing liquids.

The ink delivery system includes at least one conventional inkjet printhead system (e.g., thermal inkjet printhead and/or a piezo inkjet print head) operative to dispense (e.g., jet) the inks through one or more of a plurality of nozzles in a printhead. The printhead system incorporates an array of firing chambers that receive the photo-curable ink composition, which are in fluid communication with one or more ink devices or reservoirs.

FIG. 1 is an illustration of an ink delivery system (100) suitable for producing and using the photo-curable ink composition of the present disclosure. The ink delivery system (100) includes a number of ink devices (or ink mixing devices) (104), (108), (112) and (116) containing the first printing liquid. The number of devices could be equal to the number of colors used for printing. For example, device (104) could be used to mix cyan ink; device (108) could be used to mix magenta ink; ink device (112) could be used to mix yellow ink and ink device (116) could be used to mix black ink. A water treatment and supply device (124) could be present and used to treat and supply a controlled amount of water to each of the ink mixing devices (104), (108), (112) and (116). Devices (130) and (138) contain the second printing liquid and supply the second printing liquid to each of the ink mixing devices (104), (108), (112) and (116). As illustrated herein, the same second printing liquid, in similar or in different percentage, could be added to the ink mixing devices (104), (108) and (112) containing, for examples, yellow, cyan and magenta inks.

As illustrated in FIG. 1, a first printing liquid is introduced in each of the ink mixing devices (104), (108), (112) and (116). The ink mixing device (104) can contain cyan ink as a first printing liquid (i.e. composition containing cyan colorant); such cyan ink could represent about wt of the total weight of the final photo-curable ink composition. The ink mixing device (108) can contain magenta ink as a first printing liquid (i.e. composition containing magenta colorant); such magenta ink could represent about 55% wt of the total weight of the final photo-curable ink composition. The ink mixing device (112) can contain a yellow ink as first printing liquid (i.e. composition containing yellow colorant). The ink mixing device (116) can contain a black ink as first printing liquid (i.e. composition containing black colorant). The yellow ink and the black ink could represent about 55% wt of the total weight of the final photo-curable ink composition and could include similar or different ingredients as the ones contained in the cyan ink. As illustrated in FIG. 1, devices (130) and (138) can dose and introduce the second printing liquids into ink mixing units (104), (108), (112) and (116). Device (130) introduces the second printing liquids into the cyan, yellow and magenta inks (i.e. into the ink mixing units (104), (108), (112)), in an amount representing, for example, about 10% wt of the final ink formulation. Device (138) introduce the second printing liquids into the black inks (i.e. into the ink mixing units (116)), in an amount representing, for example, about 10% wt of the final ink formulation. Some water can be added to each of the mixing devices (104), (108), (112) and (116) using the device (124), in a desired weight percentage, in view of obtaining the final photo-curable ink composition. After a short mixing (for about 5 min to 20 min), the produced in situ photo-curable ink composition is ready for use. The photo-curable ink composition can be delivered to different printheads as shown by arrows (140).

Method for Forming a Printed Article

In some embodiments, the method for forming a printed article includes: providing a media substrate; mixing a first printing liquid containing UV curable polyurethane dispersions and colorant with a second printing liquid containing hydrophobic radiation-curable monomers, water-soluble or water-miscible radiation curable monomers and photo-initiators, in view of obtaining a photo-curable ink composition; projecting of stream of droplets of said photo-curable ink composition onto the media substrate; pinning said ink composition once printed on the media substrate; drying said ink composition; and applying photo energy to the ink composition, said photo energy having a frequency and energy level suitable for curing the photo-curable ink composition.

In some examples, water can be added to the mixture containing the first and the second printing liquids. Water could be added into the ink mixing unit in view of obtaining a photo-curable ink composition having a water content representing from about 10 to about 75 wt % of the total weight of the ink composition. Such remaining water can be supplied on the mixture containing the first and the second printing liquids through the ink mixing system. Such addition of water is not always needed as water can already be present, in the desired amount, in the first printing liquid.

Figure 2:
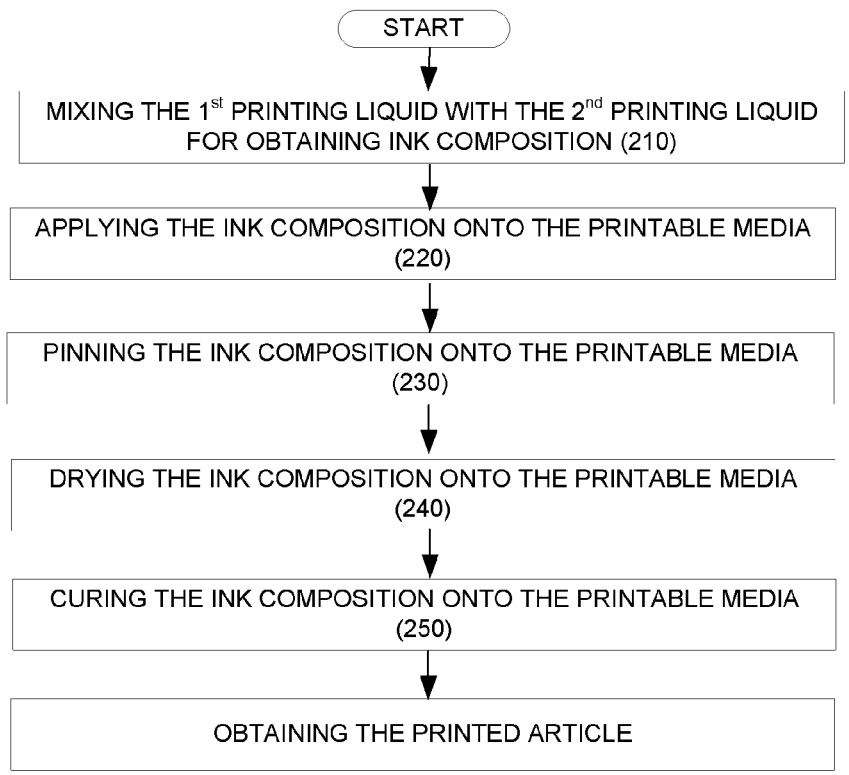
FIG. 2 is a flowchart illustrating a method for producing printed articles according to some embodiments of the present disclosure.

FIG. 2 illustrates a method for producing printed articles according to some embodiments of the present disclosure. Such as illustrated in FIG. 2, the photo-curable ink composition is obtained upon mixing a first printing liquid containing UV curable polyurethane dispersions and colorant with a second printing liquid, containing hydrophobic radiation-curable monomers, water-soluble or water-miscible radiation curable monomers and photo-initiators, into an ink mixing unit (210). Water can be optionally introduced in the mixing unit. Such ink composition is then applied onto a printable media via a projection of a stream of ink droplets (220). The projection of the stream of droplets of the inkjet compositions, onto the printable media, can be done via inkjet printing technique. The method for forming a printed article according to the present disclosure includes a pinning process (230), a drying process (240) and curing process (250).

In some examples, the projection of stream of droplets of ink composition (220), onto the media substrate, is done via inkjet printing techniques. The ink composition may be established on the material via any suitable printing techniques, such techniques include thermal, acoustic, continuous and piezoelectric inkjet printing. In inkjet printing devices, liquid ink drops are applied in a controlled fashion to an ink-receiving substrate, or media substrate, by ejecting ink droplets from a plurality of nozzles, or orifices, in a printhead of an inkjet printing device or inkjet printer. In drop-on-demand systems, a droplet of ink is ejected from an orifice directly to a position on the surface of an ink-receiving substrate, or media substrate, by pressure created by, for example, a piezoelectric device, an acoustic device, or a thermal process controlled in accordance digital data signals. For inkjet printing, the ink composition can be heated or chilled to an appropriate dispensation temperature, prior to ejecting the ink composition to the surface of a substrate. In some examples, the projection of stream of droplets of ink composition, onto the media substrate, is done via a piezoelectric printhead.

For inkjet printing, the ink composition is heated or chilled to an appropriate dispensation temperature, prior to ejecting the ink composition to the surface of a substrate. The particular temperature and viscosity of the ink composition is dependent on, for example, the particular method and equipment for conducting the inkjet printing. Considerations regarding temperature and viscosity of the ink composition relate to the effect on droplet size and droplet ejecting rate, for example.

The ink composition, once applied on the media substrate, is then submitted to a pinning process (230) and to a drying process (240). In some examples, after being jetted, the ink composition is immobilized (or pinned) to the media surface (230). The pinning process could be performed by applying low photo energy or low energy UV radiation provided, for example, by a LED. In some examples, "low level" Energy refers to energy in the range of about 1 to about 3 W/cm². UV LED can be used as an ink pinning radiation source, in order to pin the ink drop immediately after jetting but still allowing controlled spreading on the substrate. It is believed that, since water is not evaporated yet at this stage the ink does not fully crosslink, the viscosity of the ink droplet increases and the droplet thus is not completely immobilized and further spreading of the droplet is possible The printed or jetted ink composition is dried in a drying process (240) in a predetermined pattern onto the media substrate in view of evaporating the water content of the ink. The drying stage may be conducted, by way of illustration and not limitation, by hot air, electrical heater or light irradiation (e.g., IR lamps), or by a combination of such drying methods. In order to achieve a targeted performance level it is advisable to dry the ink at a maximum temperature allowable by the substrate that enables good image quality without substrate deformation. The temperature used for drying should be selected taking into consideration that fact that various plastic substrate materials tend to bend and deform at elevated temperatures. Consequently, the substrate deformation temperature should not be exceeded while drying. Examples of a temperature during drying include about 40° C. to about 150° C., or about 40° C. to about 70° C., for example. The ink composition according to the principles herein enables printing on rigid plastic materials while drying at relatively low temperatures of about 40° C. to about 70° C., or about 50° C. to about 60° C., for example, while achieving fast drying time and good image quality.

In the drying process (240), a drying hot air system or IR radiation system lamps or combination of both, may be used with the printed media in order to evaporate the remaining water present in the ink composition. In some examples, such drying stage occurs at temperatures lower than 60° C. in order to avoid media deformation when printing on plastic substrates. Higher temperatures may be used to accelerate drying by evaporation according to desired performance and choice of media.

The printed or jetted ink composition is cured (250) by applying photo energy to the ink composition, said photo energy having a frequency and energy level suitable for curing the ink composition. In such curing step, a mercury or similar lamp can be used in order to fully cure and cross link the ink composition to the media substrate. For applying photo energy, the photo-curable ink composition, on the media substrate, may be subjected to suitable light sources for curing the ink compositions in accordance with the principles described herein. Ultraviolet (UV) radiations can be used to cure the ink composition as described above. Curing radiation can be UV radiation radiated by UV lamps, blue lasers, UV lasers, or ultraviolet LEDs, for example. The curing radiation may be provided by a source of ultraviolet radiation operating in a continuous mode. The curing radiation may also be provided by a source of ultraviolet operating in a flash or pulsed mode. In some examples, in the curing process (250), the ink composition is cured by using, for example, a wide arc mercury lamp, in order to fully cure and crosslink the ink.

In accordance with the principles described herein, the photo-curable ink compositions find use as inkjet inks for inkjet printers. In some examples, the photo-curable ink compositions may be dispensed to the surface of a broad range of substrates employing inkjet technology and equipment. A suitable inkjet printer, according to the present method, is an apparatus configured to perform the printing, pinning, drying and ink curing processes. The printer may be a single pass inkjet printer or a multi-pass inkjet printer. The printer may include a temperature stabilization module operative to ensure maintenance of the range of ink jetting temperatures In some examples, the photo-curable ink composition is applied on a pre-treated media surface. An ink-receiver layer may be applied to certain substrates in a pretreatment stage prior to jetting the image in order to get the required image quality. The ink-receiving layer may be applied in a pretreatment stage digitally by applying the ink-receiver layer with piezoelectric printheads, or the ink-receiving layer may be applied in the pre-treatment stage by analog methods such as spray gun or roller coater, for example. The ink receiver layer serves as a fixer for the ink composition dispensed to the surface of a substrate in part preventing movement of ink droplets on the substrate, where the movement may result in negative image quality effects.

As mentioned, the photo-curable ink composition is jetted onto a media substrate. The media substrate may be planar, either smooth or rough, or have any other shape that is suitable for the particular purpose for which it is employed. The media substrate can have a thickness in the range of about 0.1 mm to about 10 mm or in the range of about 1 mm to about 5 mm. The media substrate may be porous or non-porous, rigid, semi-rigid, or flexible, for example. Planar media substrates may be in the form, for example, of a film, plate, board, or sheet by way of illustration and not limitation. Examples of media substrate include, but are not limited to, plastic substrates (for example, polyethylene terephthalate, polyethylene, polystyrene, polypropylene, polycarbonate and acrylic), paper, paper laminated with plastic (for example, polyethylene, polypropylene, or polystyrene), cardboard, paperboard, foam board and textiles. The media can also be rigid PVC (polyvinylchloride rigid substrate) or PETG (Polyethylene Terephthalate Glycol-modified). In some examples, the media substrate is non-porous and has low surface tension. The term "non-porous" includes surfaces that can have relatively poor water permeability, absorption and/or adsorption. Vinyl and other plastic sheets or films, metals, coated offset media, glass and other similar substrates are considered non-porous. The media substrate can be a plastic substrate.

In some examples, the media substrate is a polypropylene, a polyvinyl chloride (PVC), an acrylic or a polycarbonate substrate. The media substrates can be non-swellable and/or are non-polar. By non-swellable, it is meant herein that the substrate surface is not swelled by any components of the ink and no chemical bonds are formed between ink and substrate. By non-polar, it is meant herein that the substrate surface is charge-neutral, therefore adhesion to it is difficult to achieve.

EXAMPLES

1—List of Ingredients

TABLE (a)

| Ingredients name | Supplier | Ingredient ype |
|---|---|---|
| Neorad ®R441 [aliphatic acrylated Urethane oligomer] | DSM NeoResins | UV-PUD |

TABLE (a)-continued

| Ingredients name | Supplier | Ingredient ype |
|---|---|---|
| Neorad ®QV034B | DSM NeoResins | UV-PUD |
| Irgacure ®819 [Bis(2,4,6-trimethylbenzoyl)-phenyl-phosphineoxide] | BASF | Photo-initiator |
| N-vinylcaprolactam | BASF | Hydrophobic monomer |
| SR415 ® [ethoxylated (20) trimethylolpropane triacrylate] | Sartomer | Water soluble monomer |
| Hostafine ®Blue B2G | Clariant | Pigment preparation |
| Irgastab ® UV22 | BASF | stabilizer |
| Special Black 350 | Degussa | Pigment preparation |
| Chromophtal ® Magenta DMQ | BASF | Pigment preparation |
| Hostafine ® Yellow HR | Clariant | Pigment preparation |
| Surfynol ® 104PG50 | Air product | Surfactants |
| DX4000 | DYNAX Corp | Fluorosurfactant |

2—Ink Composition Formulations

Photo-curable ink compositions 1 to 8 are obtained by mixing, in-situ, a first printing liquid (part A) with a second printing liquid (part B). The printing liquids, Part A and Part B, are prepared and formulated separately.

Each first printing liquids (part A) are prepared according to the ratio listed in tables (b1) and (b2) and are mixed for about 10 minutes with a Dispermat® mixer (available from Byk) until a uniform solution is achieved. Formulations of the first printing liquid (part A), of ink compositions 1 to 8, are illustrated in the Tables (b1) and (b2) below.

de-foaming agent at 0.1% by total weight of mill base and balance of water. The pigment mixture is prepared by adding 200 ml of this combination and pre-mixing it in a high shear mixer for 30 min. The sample is then transferred to a horizontal bead mill (Mini 100 mill available from Eiger Machinery Inc.) for a first milling stage, in which 0.65 mm $ZiO_2$ YTZ beads (Zirmil® available from Saint-Gobain Zirpro, FR) are used as milling beads. The sample is milled at 3000 rpm for 60 min and is then transferred to a second mill identical to the first one but equipped to work with micro media beads. In the second milling stage, the sample TABLE (b1)

| Ingredients name PART A-1st printing liquid | Water content in component | Magenta INK 1 Part A ink 1 | Magenta INK 2 Part A ink 2 | Yellow INK 3 Part A ink 3 | Yellow INK 4 Part A Ink 4 |
|---|---|---|---|---|---|
| Water | 100% | 18.40% | — | 22.35% | 22.35% |
| Neorad ® R441 | 60.0% | 42.50% | — | 42.50% | — |
| Neorade ® QV034B | 60.0% | — | 42.50% | — | 42.50% |
| Hostafine ® Blue B2G | 40.0% | — | — | — | — |
| Special Black 350 | 45.0% | — | — | — | — |
| Chromophtal ® Magenta DMQ | 54.9% | 10% | 10% | — | — |
| Hostafine ® Yellow HR | 60.0% | — | — | 2% | 2% |
| DX4000 | 50.0% | 0.50% | 0.50% | 0.50% | 0.50% |
| Surfynol ® 104PG50 | 0.0% | 0.70% | 0.70% | 0.70% | 0.70% |
| Sub-total Part A | | 72.10% | 53.70% | 68.05% | 68.05% |
| Sub-total Part A water content | | 49.64% | 31.24% | 49.30% | 49.30% |

TABLE (b2)

| Ingredients name PART A-1st printing liquid | Water content in component | Yellow INK 5 Part A Ink 5 | Cyan INK 6 Part A Ink 6 | Cyan INK 7 Part A Ink 7 | Black INK 8 Part A Ink 8 |
|---|---|---|---|---|---|
| Water | 100% | — | 21.65% | — | 19.60% |
| Neorad ® R441 | 60.0% | — | 42.50% | 42.50% | 42.50% |
| Neorad ® QV034B | 60.0% | 42.50% | — | — | — |
| Hostafine ® Blue B2G | 40.0% | — | 3.40% | 3.40% | — |
| Special Black 350 | 45.0% | — | — | — | 4.50% |
| Chromophtal ® Magenta DMQ | 54.9% | — | — | — | — |
| Hostafine ® Yellow HR | 60.0% | 2% | — | — | — |
| DX4000 | 50.0% | 0.50% | 0.50% | 0.50% | 0.50% |
| Surfynol ® 104PG50 | 0.0% | 0.70% | 0.70% | 0.70% | 0.70% |
| Sub-total Part A | | 45.70% | 68.75% | 47.10% | 67.80% |
| Sub-total Part A water content | | 26.95% | 48.76% | 27.11% | 47.38% |

Parts A of the magenta ink compositions 1 and 2 contain developmental mill base Magenta pigment dispersions. Such pigment dispersion includes Chromophtal Magenta DMQ (from BASF) at 30% by total weight of mill base; Solsperse®46000 dispersant (from Lubrizol) at 15% by total weight of mill base; Tego Foamex®810 (from Evonik) as is milled with 0.1 mm $ZiO_2$ YTZ beads at 3500 rpm for 15 min. Part A of the magenta ink composition 1 further contains a commercial UV-PUD Neorad®R441 (from DSM) and a portion of water representing half of the total available free water of the complete ink formulation 1 (Part A+B+remaining free water).

Part A of the black ink composition 8 contains developmental mill base black pigment dispersions. Such pigment dispersion includes Special Black 350 (from Degussa) at 40% by total weight of mill base; Byk®190 (from Byk Chemie) dispersant at 15% by total weight of mill base; Tego Foamex® 810 as de-foaming agent at 0.1% by total weight of mill base and the balance of water. Such mixture is prepared by adding 200 ml of this combination and pre-mixing it in a high shear mixer for 30 min. The sample is then transferred to a horizontal bead mill (Mini 100 mill available from Eiger Machinery Inc.) for a first milling stage, in which 0.65 mm $ZiO_2$ YTZ beads (Zirmil®) are used as milling beads. The sample is milled at 3000 rpm for 60 min and is then transferred to a second mill identical to the first one but equipped to work with micro media beads. In the second milling stage, the sample is milled with 0.1 mm $ZiO2$ YTZ beads at 3500 rpm for 15 min. Part A of the black ink composition 8 further contains a commercial UV-PUD Neorad®R441 and a portion of water representing half of the total available free water of the complete ink formulation (Part A+B+remaining free water).

Each Part B of ink compositions 1 to 8 are prepared according to the ratio listed in table (c1) and (c2) below. Parts B are homogenous mixture of monomers and photo-initiators that are dissolved within. There are no colloidal dispersions or particles in Part B, mainly as photo-initiators are dissolved completely in the mixture. Such composition is stable, and such stability can be ensured by adding in-can stabilizer such as Irgastab®UV22 that will act as radical scavenger.

TABLE (c1)

| PART B-2nd printing liquid | Part B ink 1 | Part B ink 2 | Part B ink 3 | Part B ink |
|---|---|---|---|---|
| N-vinylcaprolactam | 6.90% | 6.90% | 6.90% | 6.90% |
| SR415 ® | 2.00% | 2.00% | 2.00% | 2.00% |
| Irgacure ® 819 | 0.60% | 0.60% | 0.60% | 0.60% |
| Irgastab ® UV22 | 0.10% | 0.10% | 0.10% | 0.10% |
| Subtotal Part B | 9.60% | 9.60% | 9.60% | 9.60% |

TABLE (c2)

| PART B-2nd printing liquid | Part B ink 5 | Part B ink 6 | Part B ink 7 | Part B ink 8 |
|---|---|---|---|---|
| N-vinylcaprolactam | 6.90% | 6.90% | 6.90% | 6.38% |
| SR415 ® | 2.00% | 2.00% | 2.00% | 5.00% |
| Irgacure ® 819 | 0.60% | 0.60% | 0.60% | 1.13% |
| Irgastab ® UV22 | 0.10% | 0.10% | 0.10% | 0.10% |
| Subtotal Part B | 9.60% | 9.60% | 9.60% | 12.60% |

Ink compositions 1 to 8 are made in situ, upon printing, by mixing both parts A and B of each composition. Water is added to the final mixture using mixing devices and an ink delivery system such as illustrated in FIG. 1. Table (d) illustrates the content of water present in the final ink compositions 1 to 8 as well as the wt % of parts A and B.

TABLE (d)

| | Magenta INK 1 | Magenta INK 2 | Yellow INK 3 | Yellow INK 4 | Yellow INK 5 | Cyan INK 6 | Cyan INK 7 | Black INK 8 |
|---|---|---|---|---|---|---|---|---|
| Subtotal A + B | 81.70% | 63.30% | 77.65% | 77.65% | 55.30% | 78.35% | 56.70% | 80.40% |
| Remaining Free Water | 18.30% | 36.70% | 22.35% | 22.35% | 44.70% | 21.65% | 43.30% | 19.60% |
| Total Formulation | 100.00% | 100.00% | 100.00% | 100.00% | 100.00% | 100.00% | 100.00% | 100.00% |

3—Ink Compositions Stability Performances

Parts A of ink compositions 1 to 8 are tested for their stability (Accelerated Shelf Life Testing) by measuring particle sizes. The purpose of this test is to evaluate colloidal stability of Parts A of the ink composition, which contains a mixture of curable polyurethane dispersion and pigment dispersion in water, as these two colloidal systems may chemically interact upon aging, either separately or together, and may agglomerate. Such agglomeration can reduce effective ink performance such as jetting ability, pinning ability, and curing ability for examples. According to this measurement, an increase of more than 30 nm in $d_{50}$ particle size would demonstrate instability of the ink.

The $d_{50}$ particle size is determined using a Malvern Zetasizer Nano (Malvern Instruments, Malvern, Worcestershire UK). Each ink composition sample is diluted at 1:1000 in de-ionized water. Each ink composition is then aged for 1 month at 45° C. and particle size is measured before and after the aging period (This accelerated aging condition simulates approximately 6 months of standard storage and shipping conditions).

The results are illustrated in table (e) below. Such table (e) shows particle size (in nm), before and after aging, that are present in part A of the ink compositions 1 to 8. These results demonstrate the stability of parts A of ink compositions 1 to 8 and illustrate, more generally, the stability of the photo-curable ink compositions obtained upon mixing the first printing liquid with the second printing liquid according to the present disclosure.

TABLE (e)

| | Part A Magenta ink 1 | Part A Magenta ink 2 | Part A Yellow ink 3 | Part A Yellow Ink 4 | Part A Yellow Ink 5 | Part A Cyan Ink 6 | Part A Cyan Ink 7 | Part A Black Ink 8 |
|---|---|---|---|---|---|---|---|---|
| $d_{50}$ Before | 117 nm | 121 nm | 86 nm | 115 nm | 116 nm | 110 nm | 118 nm | 105 nm |
| $d_{50}$ After 1 month 45 C. | 119 nm | 150 nm | 89 nm | 120 nm | 125 nm | 111 nm | 125 nm | 128 nm |
| $d_{50}$ Increase | 2 nm | 29 nm | 3 nm | 5 nm | 9 nm | 1 nm | 7 nm | 23 nm |
| Stable | Yes | Yes | Yes | Yes | Yes | Yes | Yes | Yes |

The invention claimed is:

1. A photo-curable ink composition obtained upon mixing a first printing liquid with a second printing liquid wherein:
   a. the first printing liquid includes, at least:
      i. UV curable polyurethane dispersions,
      ii. and colorant;
   b. the second printing liquid includes, at least:
      i. hydrophobic radiation-curable monomers,
      ii. water-soluble or water-miscible radiation curable monomers,
      iii. and photo-initiators;
   wherein a final water content represents from about 10 to about 75 wt % by total weight of the obtained photo-curable ink composition.

2. The photo-curable ink composition of claim 1 wherein the first printing liquid includes pigment dispersions as colorant.

3. The photo-curable ink composition of claim 1 wherein the first printing liquid includes water-dispersible acrylic functional polyurethane as UV curable polyurethane dispersions.

4. The photo-curable ink composition of claim 1 wherein the second printing liquid includes water-soluble or water-miscible radiation curable monomers that are ethoxylated tri-methylpropane triacrylates or acrylam ides monomers.

5. The photo-curable ink composition of claim 1 wherein the second printing liquid includes hydrophobic radiation-curable monomers that are selected from the group consisting of vinyl caprolactam, hexanediol diacrylate, trimethylolpropane triacrylate and propoxylated neopentyl glycol diacrylate.

6. The photo-curable ink composition of claim 1 wherein the first and/or the second printing liquid(s) further contain(s) one or more additive(s) selected from the group consisting of surfactant, dispersing agent, UV stabilizer, de-foaming agent, rheology modifiers and biocides.

7. The photo-curable ink composition of claim 1 wherein the first printing liquid represents from about 40 to about 75 wt % of the total weight of the obtained photo-curable ink composition.

8. The photo-curable ink composition of claim 1 wherein the second printing liquid represents from about 5 to about 15 wt % of the total weight of the obtained photo-curable ink composition.

9. The photo-curable ink composition of claim 1 wherein the UV curable polyurethane dispersions include polyurethane polymer particles having a core-shell structure.

10. A set of printing liquids comprising:
   a. a first water-based printing liquid that includes, at least, water as a solvent, UV curable polyurethane dispersions and colorant; and
   b. a second printing liquid that includes, at least, hydrophobic radiation-curable monomers, water-soluble or water-miscible radiation curable monomers, and photo-initiators;
   wherein said liquids are kept in, at least, two separate devices and form, upon mixing, a photo-curable ink composition; and
   wherein said liquids form, upon mixing, a photo-curable ink composition having a final water content representing from about 10 to about 75 wt % by total weight of the obtained photo-curable ink composition.

11. An inkjet printing system comprising:
   a) a media substrate;
   b) a set of printing liquids such as defined in claim 10;
   c) an ink delivery system suitable for using the set of printing liquids;
   d) photo energy sources configured to apply photo energy to the obtained photo-curable ink composition once printed on a substrate, said photo energy having a frequency and energy level suitable for pinning, drying and curing the photo-curable ink composition.

12. The inkjet printing system of claim 11 wherein the photo energy source is a UV light source.

13. The set of printing liquids of claim 10 wherein the UV curable polyurethane dispersions include polyurethane polymer particles having a core-shell structure.

14. The set of printing liquids of claim 10 wherein:
   the first water-based printing liquid consists of the water, the UV curable polyurethane dispersions and the colorant, and optionally an additive selected from the group consisting of a surfactant, a dispersing agent, a UV stabilizer, a de-foaming agent, a rheology modifier, a biocide, and combinations thereof; and
   the second printing liquid consists of the hydrophobic radiation-curable monomers, the water-soluble or water-miscible radiation curable monomers, and the photo-initiators, and optionally an additive selected from the group consisting of a surfactant, a dispersing agent, a UV stabilizer, a de-foaming agent, a rheology modifier, a biocide, and combinations thereof.

15. The set of printing liquids of claim 10 wherein the first water-based printing liquid includes the water in an amount ranging from about 27 to about 49 wt %.

16. A method for forming a printed article comprising:
   a) providing a media substrate;
   b) mixing a first printing liquid containing water-based UV curable polyurethane dispersions and colorant with a second printing liquid containing hydrophobic radiation-curable monomers, water-soluble or water-miscible radiation curable monomers and photo-initiators, to obtain a water-based photo-curable ink composition;
   c) projecting of a stream of droplets of said water-based photo-curable ink composition onto the media substrate;
   d) pinning said water-based photo-curable ink composition once printed on the media substrate;
   e) drying said water-based photo-curable ink composition to evaporate water therefrom; and f) applying photo energy to the dried photo-curable ink composition, said photo energy having a frequency and energy level suitable for curing the dried photo-curable ink composition; and further comprising the addition of water to the mixture of the first and second printing liquids into an ink mixing unit, to obtain the photo-curable ink composition having a final water content representing from about 10 to about 75 wt % by total weight of the photo-curable ink composition.

17. The method for forming a printed article of claim 16, wherein the projection of stream of droplets of ink composition, onto the media substrate, is done via a piezoelectric printhead.

18. The method for forming a printed article of claim 16 wherein the media substrate is paper, paper laminated with plastic, cardboard, or paperboard.

* * * * *

UNITED STATES PATENT AND TRADEMARK OFFICE
CERTIFICATE OF CORRECTION

PATENT NO.        : 9,523,012 B2                                              Page 1 of 1
APPLICATION NO.   : 14/779821
DATED             : December 20, 2016
INVENTOR(S)       : Or Brandstein et al.

It is certified that error appears in the above-identified patent and that said Letters Patent is hereby corrected as shown below:

In the Claims

In Column 19, Line 37, in Claim 4, delete "acrylam ides" and insert -- acrylamides --, therefor.

Signed and Sealed this
Twenty-third Day of May, 2017

Michelle K. Lee
*Director of the United States Patent and Trademark Office*